Nov. 10, 1942.   R. BILLAUDOT   2,301,242
ART OF MANUFACTURING GELATIN
Filed Nov. 30, 1939

INVENTOR
RENÉ BILLAUDOT
BY
ATTORNEY

Patented Nov. 10, 1942

2,301,242

UNITED STATES PATENT OFFICE 2,301,242

ART OF MANUFACTURING GELATIN

Rene Billaudot, New York, N. Y.

Application November 30, 1939, Serial No. 306,804

7 Claims. (Cl. 260—118)

This invention relates to the art of manufacturing gelatin, and provides improvements therein.

Rabbit skins, especially in the form known as coney shred is well known as a potential stock from which to manufacture gelatin, and in the past methods have been proposed for utilizing it in the manufacture of gelatin. Notwithstanding, no industrially practicable method of manufacturing gelatin from rabbit skins (coney shred) has heretofore been discovered. There is, and has been, a large inducement to the use of rabbit skins (coney shred) as stock for the manufacture of gelatin, inasmuch as the price of coney shred is about one-tenth that of materials now generally used as stock for the manufacture of gelatin.

The present invention provides an industrially practicable and commercial process for the manufacture of gelatin from rabbit skins (coney shred).

The present invention provides a process which is capable of being expeditiously carried out, the process up to the point where the drying of the extracted gelatin begins, being capable of being completed within 24 hours. The process also furnishes a gelatin extract which does not require concentration, and which can be dried even in warm weather without encountering the difficulties usually met with in warm weather in connection with other processes.

The present invention provides a method by which gelatin of high quality is obtained; the gelatin obtained is suitable for use as a food product and for technical uses where high purity is required as in the photography industry. The bad odor of the gelatin made from coney shred, which previous efforts have not succeeded in eliminating, is eliminated by the present method.

In previous attempts to manufacture gelatin from coney shred a major difficulty has been the degeneration of the stock to a mushy or coherent mass. This difficulty is avoided by the present invention. High yields of gelatin of superior quality are obtained according to the present invention.

The invention further provides a novel product, a gelatin containing iso-sulfocyanate crystals and having enhanced clarity or limpidity which transmits light with little adsorption, and hence highly useful for photographic use.

A drawing, as an aid to the description, is annexed hereto.

Referring to said drawing, Fig. 1 is a diagrammatic view illustrating a mode of procedure in practicing the invention.

Figure 1:
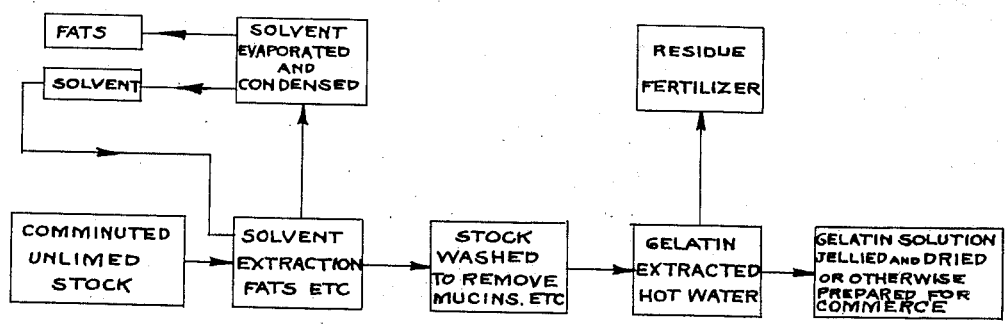

As stock, I use rabbit skins, especially in the form of clipped shreds or strips (about 4 inches long and one-sixteenth inch wide) widely available as waste from the hatters industry, and generally known as coney shred.

It is advantageous to comminute them in order to provide more ready access of the solvent used in a later stage of the process, to the fats, mucins, albumins contained in the fibrous structure of the skin. For the manufacture of gelatin of good quality, the remaining hair should be removed, or substantially so. This, it has been found may be accomplished simultaneously with the comminution, the comminution severing most of the remaining hair from the skin, the separated hair being readily removed by the winnowing action of the cutting machine. Satisfactory results have been obtained by cutting the coney shred into pieces or shreds averaging about ¼" long, $\frac{1}{32}$" wide. The comminution should not be too great (that is, the stock should not be cut into too small pieces), as this will cause difficulties in the so-called boiling process, even when practiced in the particular way hereinafter described.

The stock is placed in the container, together with a fat solvent without previous wetting or treatment other than the comminution and the separation of hair by winnowing referred to above. The solvent may be introduced into the container as a liquid or as a vapor. The stock is advantageously agitated, as by means of a paddle, or other suitable means, during the treatment thereof with the solvent. Solvents which have been found to give the desired fat removal together with bleaching and deodorization, are dichlormethylene and trichlorethylene. Trichlorethylene is preferred, because it has a high vaporizing point, is non-explosive, has a high fat extraction rate, and readily emulsifies water. It also has a bleaching action and is highly effective as a deodorant.

The control of the temperature is important. The temperature should not exceed 32° C., and an operating temperature of 23° C. plus or minus 2° is recommended, because at about 34° C. the solvent not only has an action on the fat, but also on the collagen.

The extraction of the fat is preferably performed in successive treatments. Usually three extractions are sufficient to completely remove the fats, and partly remove the mucins and albumins. During each extraction the stock is submitted to the action of the solvent for about one hour. If in any particular case all the fats have not been removed after the third extraction, subsequent treatments with the solvent are made. For each fat extraction approximately three volumes of solvent to one volume of stock are used.

After the completion of the fat extraction the solvent is expelled from the stock. The expulsion of the solvent may be effected in different ways, as by applying warm air or steam through the stock, by centrifugal action, by treatment in a vacuum apparatus, etc.

At this stage the stock may be stored for later use, if desired. The action of the fat solvents, particularly of chlormethylenes, chlorethylenes and mixtures entirely removes the offensive odor of coney shred from the stock. The chlorethylenes and the chlormethylenes also have a bleaching action on the stock.

To proceed with the manufacture of the gelatin, the stock is washed and soaked in clean running water at ordinary summer tap water temperature, about 18–24° C. (68–75° F.) for about two to four hours, until the water runs clear, and until the mucins and albumins have been removed. The temperature of the water should not be high enough to show extraction of collagen at this part of the process. During the soaking the volume of the stock about doubles. The stock, after the fat solvent treatment is exceptionally hydrophilous, and the wetting of the skin, and the removal of the mucins and albumins proceeds with exceptional speed.

After soaking and draining, the stock is placed in a vessel, and immersed in clean hot water. The volume of water is approximately two and one-half to three times the volume of the previously soaked stock. The temperature of the water is between 80° and 90° C. (184–198° F.) and for maintaining this temperature the vessel may be provided with a steam heated hot water jacket, such for example, as that shown at 10, in Fig. 2.

The shape of the container (12) is such as to extend the volume in a horizontal direction, so that the mass of stock in the container is loose, the upper part not packing or bearing with any considerable weight upon the lower parts of the mass. The mixture of the stock in hot water occupies about three-quarters of the volume or capacity of the container, leaving a space for expansion of the stock as hereinafter described.

The extraction of the gelatin is advantageously carried out successively. The gelatin solution is drawn off and the water replaced several times. According to the present invention it has been found that a complete extraction of gelatin is obtained ordinarily in three extractions. The runs or extractions are each of about one hour duration, though ordinarily it is found that almost all of the gelatin is extracted after about three quarters of an hour of the second run.

During the hot water extraction or boiling the mixture in the closed vessel is subjected intermittently to the action of a vacuum. Periods of partial vacuum lasting about five minutes each, are established in the container, giving about six periods of partial vacuum or sub-atmospheric pressure, and six periods of normal atmospheric pressure, within the vessel within the hour.

When a normal atmospheric pressure in the vessel is succeeded by a sub-atmospheric pressure, there is a swelling or unheaval of the mass of stock, causing a separation and movement of the particles of stock and agitation and consequent replacement of the liquid in immediate contact with the particles of stock and which is relatively highly concentrated with the gelatin, with fresh water or with aqueous gelatin solution which is relatively weak. By reason of the hydrophilous character of the stock, as previously explained, the action of the hot water in extracting the gelatin is unusually fast. The speed is also aided by the large surface area relative to the mass, resulting from the comminution. Upheavals due to the successive states of partial vacuum prevents the stock from becoming mushy, or from packing, and thereby retarding the access of the hot water to all parts of the stock. As heretofore indicated the action of the intermittent vacuum is to cause the stock to swell and to buoy it. The movement due to the buoyancy brings fresh portions of the hot water or gelatin solution into intermittent contact with the stock, thereby increasing the osmotic action. The swelling of the stock separates the structural fibers of the skin which enmesh the collagen, and the gelatin formed therefrom, and thereby facilitates the osmotic exit of the collagen or gelatin. By reason of the hydrophilous character of the stock, as previously explained, it is possible to obtain a complete extraction in from one-half to one-third the time required for extracting gelatin by previously used processes. The yield is high, the recovery of gelatin in its dried form being about 60–65% of the dry defatted stock from which the gelatin is extracted.

The time in which the extraction of the gelatin is done is ideal from the standpoint of the quality of the gelatin.

Figure 3:
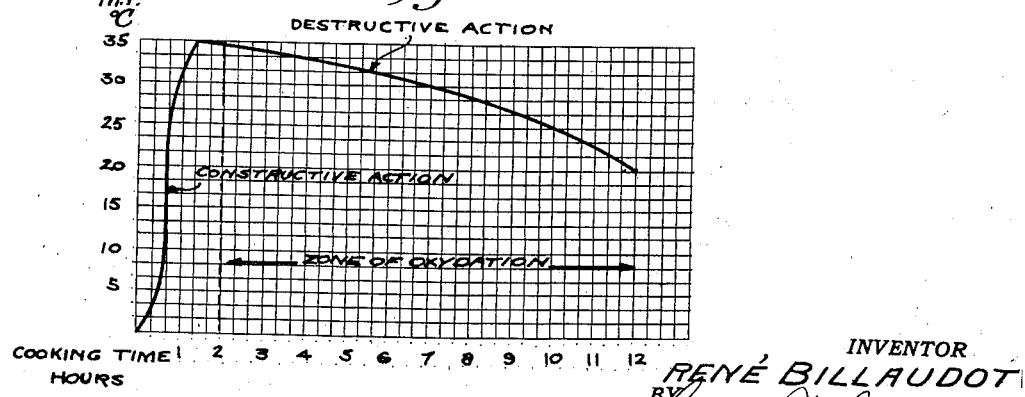
Fig. 3 is a graph on which has been plotted a curve showing the effect which time has on the quality of the gelatin during the so-called "boiling" or heating of the treated stock in water to extract the gelatin.

By reference to the accompanying graph, Fig. 3, it will be observed that two actions occur during the extraction. There is first, the "constructive action" during which the collagen in the stock is hydrolysed, which is followed by a period in which there is a "destructive action" in which the gelatin is further hydrolysed, and also oxidized, to form other substances, some of which have been identified as semi-glutin, and hemicollon. It will be observed from the graph Fig. 3, that as the gelatin obtains its maximum quality as represented by the melting point of the gelatin (35° C.) in about one and three-quarter hours, during the continuation of the constructive action, and that this constructive action is virtually exclusive for about one and three-quarter hours. As already pointed out, complete or virtually complete extraction of a gelatin, according to the present process may be completed in about the same time, that is, one and three-quarter to two hours. The present process therefore yields a gelatin which is virtually free of products resulting from the "destructive action" which occurs after the hydrolysis of the collagen. Moreover, the movement or agitation which occurs by reason of the intermittent vacuum is gentle, and there is a minimum detachment of fibers and other insoluble matter which it is difficult to separate by filtration. The solution obtained according to the present process is therefore very free from small quantities of foreign matter which are found in gelatins produced according to other processes, and which impart opacity and color to the gelatin, detract from its qualities, and render it unsuitable for certain industrial uses, as for example, use in photography. Also by reason of the complete extraction of fats, the gelatin is "non-foaming." The necessity of skimming the solution, during the extraction is therefore avoided in the present process. Gelatin prepared from rabbit skins according to the present invention, is a novel product. Such a gelatin has been found to contain isosulfocyanate crystals and by reason thereof to have improved light transmitting properties, the absorption of light thereby being small, and rendering the gelatin superior for photographic use. The gelatin produced according to the present invention possesses this small absorptivity because the method of treatment, especially the limited temperatures used, does not destroy the iso-sulfocyanates which are found in the skins of rabbits.

Compared with liquors or gelatin solutions obtained by previous processes, the solutions obtained according to the present process are relatively highly concentrated, the first one giving a concentration of 8 to 10 percent, and the second run giving a concentration of about 5 percent of gelatin. By mixing the two runs, a concentration of around 7 percent of the gelatin by weight is obtained. This comparatively high concentration of gelatin is of great advantage in the subsequent treatment of the solution, as hereinafter pointed out. In the two extracts made according to the present invention, the gelatin is of substantially the same quality and may be united or combined, and a gelatin of high quality obtained.

The gelatin solution may be treated in much the same way that gelatin solutions are treated according to former methods. The solution is filtered, run into pans or "coolers" and then dried. There are however differences in the behavior of the jelly solution obtained according to the present invention. It does not require concentration, as is required with the solutions obtained by former processes. It readily jellys in the pans or coolers, and it is not necessary to use artificial refrigeration even in hot weather. Satisfactory jelling has been obtained from solutions according to the present process, without artificial refrigeration at a summer temperature of 85° F.

Drying of the jelly obtained according to the present process, is much simplified especially in warm weather. The drying of jellies produced, according to prior processes is usually started at about 18° C. (60° F.), the temperature being increased progressively up to about 50° C. (122° F.) at the last part of the drying period; with jellies produced according to the present invention, drying has been started at about 29° C. (85° F.), and the drying is readily done in about 18 hours. The shorter drying time as compared with the jellies obtained according to prior processes lessens the time during which the jelly is open to the entrance of bacteria and spores from the air which is used for drying and hence produces a gelatin of superior keeping quality.

The extraction of the gelatin, according to the present process making use of the intermittent vacuum may be carried out to advantage on stocks which have been prepared for the extraction treatment in other ways than that herein described.

Figure 2:
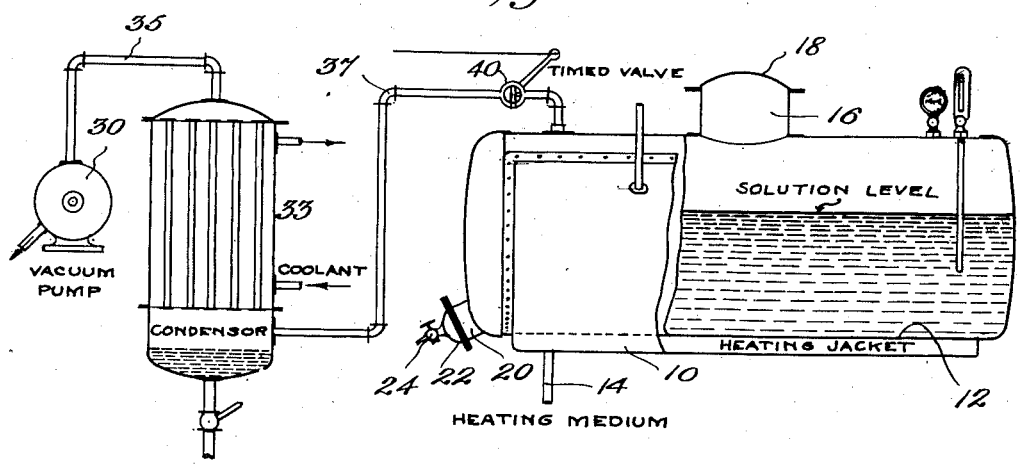
Fig. 2 illustrates an embodiment of apparatus in which the extraction of the gelatin may be carried out, the drawing showing the apparatus partly in vertical section and partly in elevation.

The vessel for extracting the collagen or gelatin, and the embodiment thereof illustrated in Fig. 2, have been referred to above. The vessel 12 as previously stated, has its volume extended in the horizontal direction, good results having been obtained with a length approximately three times the diameter. The vessel 12 is provided with a heating jacket 10, and the heating medium in the jacket is preferably water which is heated by live steam introduced into the water, as through the pipe 14. The vessel has a filling opening 16 closed by a lid 18, and an emptying opening 20 closed by the lid 22. In addition, a valved outlet 24 may be provided for drawing off solution. A partial vacuum or sub-atmospheric pressure may be produced by means of a vacuum pump 30. The vacuum pump advantageously is in communication with the interior of the vessel 10 through a condenser 33, the vacuum pump being connected to the condenser by means of a pipe 35 and the condenser being connected with the vessel 12 by a pipe 37. A three-way valve 40 in the pipe 37 serves to put the interior of the vessel 12, at proper times, into communication respectively with the outside atmosphere and with the vacuum pump.

The invention may be carried out by other modes of procedure than that herein specifically described.

What is claimed is:

1. A method of manufacturing gelatin, comprising first subjecting comminuted coney shred in its commercially dry state to the action of a warm fat solvent consisting of the group trichlorethylene, dichlormethylene, at a temperature not exceeding approximately 32° C., to extract the fat, bleach and deodorize, then agitating it in water to remove mucins and albumins, and then extracting the collagen in hot water with simultaneous hydrolysis to form gelatin.

2. A method according to claim 1, further comprising maintaining the temperature during the fat extraction at 23° C. plus or minus 2°.

3. A method according to claim 1, further comprising maintaining the temperature of the water in which the stock is soaked after the fat extraction under about 24° C.

4. A method according to claim 1, further comprising maintaining the temperature of the water in which the extraction of gelatin is carried out at approximately 80–90° C.

5. A method according to claim 1, further comprising carrying out substantially completely the extraction of the gelatin by the hot water in two major extractions of about one hour each.

6. A method according to claim 1, further comprising alternately producing partial vacuum and atmospheric pressure on the mass during the hydrolysis and extraction of the gelatin.

7. In a method of manufacturing gelatin, subjecting comminuted coney shred in its commercially dry state to the action of warm trichlorethylene at a temperature not exceeding 32° C. to extract the fat, bleach and deodorize, and obtain a stock for the extraction of the collagen, having good keeping qualities.

RENE BILLAUDOT.